United States Patent
Araya

(10) Patent No.: US 10,360,513 B2
(45) Date of Patent: Jul. 23, 2019

(54) BELIEF DATA MODEL MANAGEMENT SERVICE

(71) Applicant: Carlos Luis Araya, Saratoga, CA (US)

(72) Inventor: Carlos Luis Araya, Saratoga, CA (US)

(73) Assignee: SINGULAR ME CORP, Saratoga, CA (US)

( * ) Notice: Subject to any disclaimer, the term of this patent is extended or adjusted under 35 U.S.C. 154(b) by 641 days.

(21) Appl. No.: 14/940,007

(22) Filed: Nov. 12, 2015

(65) Prior Publication Data

US 2016/0132777 A1 May 12, 2016

Related U.S. Application Data

(60) Provisional application No. 62/078,219, filed on Nov. 11, 2014.

(51) Int. Cl.
*G06F 15/18* (2006.01)
*G06N 20/00* (2019.01)

(52) U.S. Cl.
CPC .................... *G06N 20/00* (2019.01)

(58) Field of Classification Search
CPC ...................................... G06N 7/005
USPC .............................. 706/12, 45, 47
See application file for complete search history.

(56) References Cited

PUBLICATIONS

Agrawal, et al., "Fast Algorithms for Mining Association Rules," *Proceedings of the 20th International Conference on Very Large Databases, VLDB*, pp. 487-499, (1994).

Araya, "On the Knowledge Representation Capabilities of a Modal Logic," *Proceedings of the 7th Florida Artificial Intelligence Research Symposium*, Florida AI Research Society, pp. 165-169, (1994).

Araya, "Schemata—A Language for Deduction and its Application in Nonmonotonic Reasoning," Ph.D. Dissertation, Dept. of Computer Science, Univ. of Kansas, pp. 123-146, (1990).

Bressan, "A General Interpreted Modal Calculi," pp. 10-14, 15-48, 55-60, 124-126, 147-164, (1972).

Brown, "A Modal Logic for the Representation of Knowledge," in *The Frame Problem in Artificial Intelligence: Proceedings of the 1987 Workshop*, pp. 135-157, (1987).

Carnap, "Meaning and Necessity: A Study in Semantics and Modal Logic," (1947).

*Primary Examiner* — David R Vincent
(74) *Attorney, Agent, or Firm* — Alston & Bird LLP

(57) ABSTRACT

In general, embodiments of the present invention provide systems, methods and computer readable media for providing a belief data modeling service for representing and operating belief models data. In embodiments, a belief data modeling service may be configured to perform operations comprising receiving a belief data modeling service request including an input data model representing a set of data, a set of input parameters including at least one of observational data and modeling data, and an operation to be applied to the input data model using the input parameters; and, in response to receiving the belief data modeling service request, generating an output belief data model of the set of entities by generating new states and a set of logical conditionals that constrain the states for at least a subset of the entities by applying the input operation to the input data model.

20 Claims, 10 Drawing Sheets

BELIEF DATA MODEL MANAGEMENT SERVICE

CROSS-REFERENCE TO RELATED APPLICATIONS

This application claims the benefit of U.S. Provisional Application No. 62/078,219, entitled "Systems And Methods To Learn, Represent, Calculate And Use Rational Belief Systems," and filed Nov. 11, 2014, of which the entire contents are hereby incorporated by reference.

FIELD

Embodiments of the invention relate, generally, to systems and methods for providing a belief data modeling service for representing and operating belief models data.

BACKGROUND

Nowadays human organizations engage in different levels of understanding what their customers buy and why, what their real needs are, their influencers, and the way they like to be served. However, do these organizations really know their customers?

With new data sciences and analytics tools, customer attention and marketing practices are going through a new revolution based on deeper and broader information, with more engaging and customized stories, and faster business cycles. The new Holy Grail is "segment of one" strategies where information and interaction is personalized to the individual as opposed to traditional aggregated segments. Sentiment analyses using social media (e.g., Facebook, Twitter) can be material in preventing customer churn, a key worry for many companies. However, these tools typically do not accurately reflect a unified and solid vision that meets the growing expectations of customers.

The Internet-Of-Things provides another opportunity to extend people's and systems' awareness with multitudes of intelligent devices in ever more complex configurations, with ever-larger autonomy and cleverness. Data science and analytics tools are being used in this and other scenarios to construct models of complex systems and phenomena. The new generation of applications will inherit the same requirements and limitations of marketing and customers modeling.

Today existing solutions deliver only partially on their promises and require sophisticated and expensive expertise and resources. For example, personalization and omni-channel solutions construct the models from aggregations down, instead of from the individuals up. That is good for some applications, but for understanding a person, they lack a sound, complete, and flexible conceptual modeling framework of all the individual dimensions. Implementing what the customer believes, knows, is interested in, and their decision patterns is limited in scope, capability, and usability.

Current methods are ad-hoc and sometimes disperse annotations that cannot reasonably claim to represent customers' beliefs, interests, or behaviors. Although the growing availability of data sciences and so=called big data algorithms and platforms can generate tremendous business value on specific tasks, they are narrowly scoped and limited in the handling in the generated models. Such models-by-annotation do not offer the capability to simulate or interact with them, and if they model behaviors it is usually through procedural rules that are hard to learn, stabilize, and maintain, and have no adaptability and any other basic cognitive capabilities.

It is recognized that the biggest trouble with most data science models is that they cannot be presented in a concise and consumable way for business personnel to be able to take relevant action. Data scientists can hardly visualize the resulting data that are output from the models, and comprehending what is coming out of such systems is becoming even more complex as machines and algorithms become ever more capable. Filling the gap between such systems and people's understanding requires sophisticated abstractions that must resemble in some form the modular and introspective images of customers, colleagues, friends, and theories of some systems and phenomena.

The conceptual richness that can be attained by such sophisticated abstractions may permit more intuitive data analysis solutions with which we can interact in natural ways, that can give us insight about their function and response to change, that can respond questions about their beliefs and behaviors, that can be used to analyze what-if situations, that can help us understand how to make them behave in some desired ways, and that can allow more autonomous application because of their judgment level. Through applied effort, ingenuity, and innovation, solutions to improve such methods have been realized and are described in connection with embodiments of the present invention.

SUMMARY

In general, embodiments of the present invention provide herein systems, methods and computer readable media for providing a belief data modeling service for representing and operating belief models data.

In embodiments, a belief data modeling service may be configured to perform operations comprising receiving a belief data modeling service request including an input data model representing a set of data, a set of input parameters including at least one of observational data and modeling data, and an operation to be applied to the input data model using the input parameters; and, in response to receiving the belief data modeling service request, generating an output belief data model of the set of entities by generating new states and a set of logical conditionals that constrain the states for at least a subset of the entities by applying the input operation to the input data model.

In embodiments, the input data model may comprise a set of entities, each of the entities being associated with an entity identifier and at least one state, and the operation may include at least one of a group of operations including import to create a new belief data model using the input data model, revision to revise the input data model, contraction to contract the input data model, acceptance of the input parameters to be determined for the input data model, consistency to be determined between the input data model and the input parameters, explanation of the input parameters, diagnosis of a discrepancy between the input data model and the input parameters, and at least one of a set of input data model modification requests.

In embodiments, each new state may be represented by a logical composite of boolean relationships between symbols and constant values, each logical conditional prescribing that if certain conditions are logically fulfilled in a state, and certain conditions are consistent in a state, then conditional consequences should be fulfilled in a reference state.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 9:
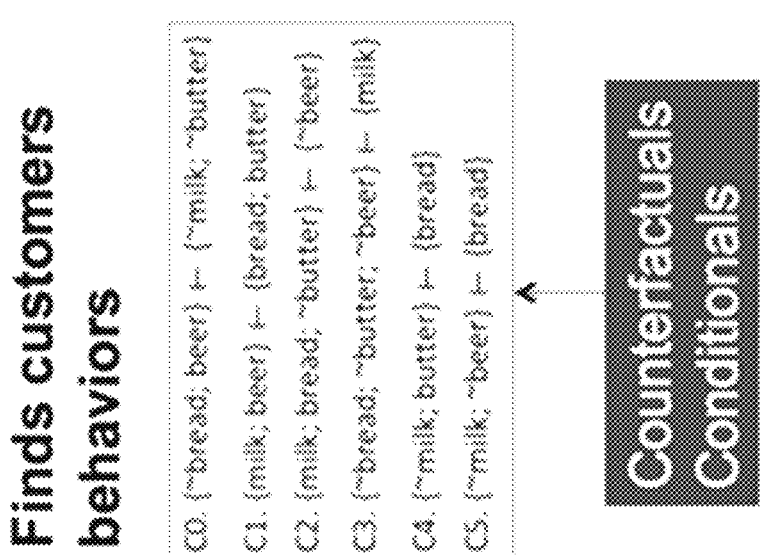
Figure 10:
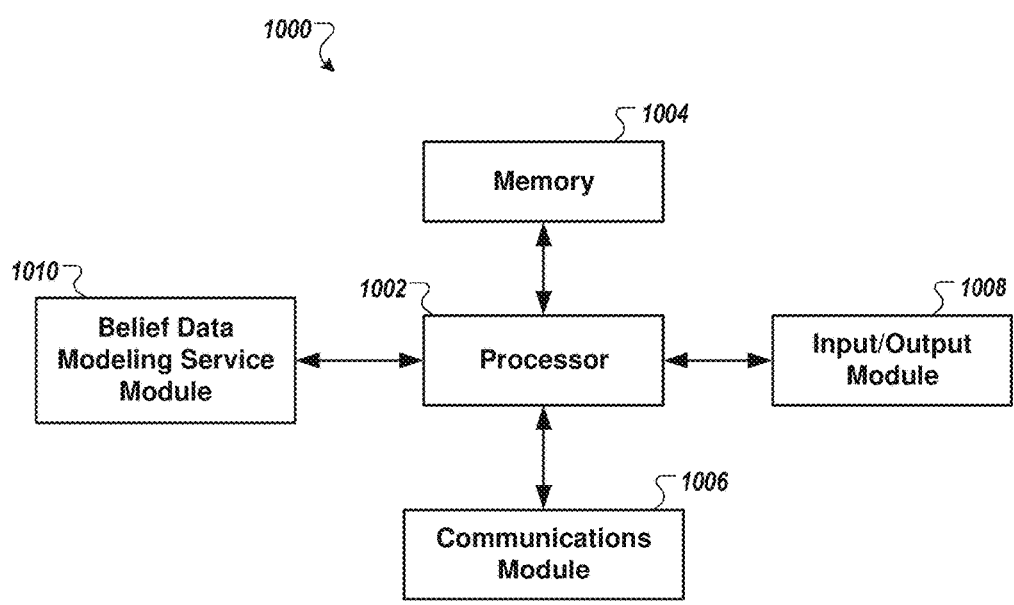

FIG. 9 depicts an exemplary rule mining Market Basket analysis in which belief data models are used to model customer preferences of products and selections with conditionals in accordance with some embodiments discussed herein; and FIG. 10 illustrates a schematic block diagram of circuitry that can be included in a computing device, such as a belief data modeling service, in accordance with some embodiments discussed herein.

DETAILED DESCRIPTION

The present invention now will be described more fully hereinafter with reference to the accompanying drawings, in which some, but not all embodiments of the invention are shown. Indeed, this invention may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

According to some example embodiments, the systems and methods described herein are configured to generate belief data models for real-world applications that range, for example, from representations to learning, calculations, and use methods. Belief data models are based on a unified information modeling theory that is based on modal logics.

In embodiments, a belief data model includes models of complex entities (i.e., "belief representations") that may be used in a variety of different applications (e.g., simulations, predictions, diagnosis, recommendations, and the like). In embodiments, equations of variables with logical information represent complex system states, including belief representations and behaviors, and these variables can be used to keep track of the entities' belief representations. Some exemplary concepts and operations enabled by a belief data model include "Empirical Reasoning" (i.e., calculations originating in or based on observation or experience, capable of being verified or disproved by observation or experiment); and "Intelligent Adaption" (i.e., methods to determine what to do once some observations disprove your empirical knowledge differs from observations or experiments).

In embodiments, subspaces of information in a belief data model are represented as belief states. The modeling and calculations using belief states are similar to common mathematics. In common mathematics, a variable can represent the position or state of a particle in a space. For example, $x=0.10$ shows that the particle is in position 0.10. In a belief state, a variable represents beliefs as an information space; Thomas={x:0.10; todayIs:Monday; Not(checkingAccountUnderMinimum)} would represent that Thomas believes that the position of the particle is 0.10, that today is Monday, and that the checking account is not under minimum value.

Following the example above, a larger subspace (with less restricted information) where x is bigger than 0.10, the day is Monday but without information about the checking account, can be expressed as {x>0.10; todayIs:Monday}.

In embodiments, a variety of operations may be applied to belief data models as described, for example, in Araya, C. On the Knowledge Representation Capabilities of a Modal Logic, in Proceedings of 1994 Florida AI Research Symposium, FLAIRS-94, Florida, May (1994); and Araya, C., SCHEMATA—A Language for Deduction and its Application in Nonmonotonic Reasoning, Ph. D. Dissertation, Dept. of Computer Science, Univ. of Kansas (1990)], which describes how a symbolic programming language and a modal logic can be used to model some change scenarios. The modal logic—one that in addition to 'and' and 'or' so also has 'necessity' among its concepts, was based on the concepts proposed by [Carnap] R. Carnap, "Meaning and Necessity", 1947, by [Bressan] A. Bressan, "A General Interpreted Modal Calculi", 1973 and by F. Brown and S. Park in [F. Brown, "The Modal Logic Z", In The Frame Problem in AI, 1987].

In a more formal description of the operations, using sets theoretical concepts, assume that K is the set of all beliefs (belief states or simply states) of an entity at a given moment. Solutions to equations of the form:

$$Kt+1=\{A\}\cup\{X:X \text{ is entailed by } K_t \text{ and } X \text{ is possible with respect to } K_{t+1}\} \quad [EQ1]$$

have been found to correspond to the solutions prescribed by a collection of postulates for belief revision of rational entities proposed by Alchourron, Gardenfors, and Makinson (the "AGM" postulates, hereinafter) for the revision of $K_t$ with A, ($K_t*A$ in AGM notation). The generated solutions to this equation are fixed-points or singularities since $K_{t+1}$ is referenced in both sides of the equation. The second set describes all beliefs X such that "X is entailed by K"—meaning $X \subset K$, and "X is possible with respect to K"—meaning $X \cap K \neq \emptyset$, that is X is consistent with K. In embodiments, these fixed-points can be calculated in logical expressions; very complex forms of these equations can be calculated and resolved. These equations can produce zero or more fixed-points and, provided that A is consistent, be guaranteed to always produce at least one solution.

In embodiments, a specific method called conditionals is used to model patterns of choice, decision, or behavior of entities in a belief data model. These conditionals approximate the if-then concepts of natural language as logical constraints on the values that variables can take. In some situations, conditionals might be contradictory to fact—or counterfactual. Conditionals come from observing that conditional sentences in natural languages, such as "birds fly," do not always follow the material implication meaning—some birds do not fly. Using material implication to represent such a conditional would therefore not work as in the case of penguins or some other birds that accidentally, exceptionally, or naturally do not fly.

In embodiments, a belief representation is a collection of belief states and conditionals. In some embodiments, machine learning algorithms may be applied to a belief data model to learn conditionals by recognizing the way variables and values are associated.

In embodiments, a form of conditionals may be used to model some patterns of decision and behaviors of the belief data model entities as well as the change operation described by EQ1. In some embodiments, the conditionals are similar to rules, but they are different from the rules used in rule-based systems. There is no form to model these concepts using normal material implication or rule-based systems.

Using the Modal Logic, conditionals, represented as $A>_K B$, may be implemented in the following way:

$$K_{t+1}=\ldots (A \text{ is entailed by } K \text{ and } B \text{ is possible in } K_{t+1}) \rightarrow B \quad [EQ2]$$

Using this equation, EQ1 could be rewritten as:

$$K_{t+1}=\{A\}\cup\{X:X>_K X\} \quad [EQ3]$$

In some embodiments, this type of conditional may be learned. As an example, when A and B appear together frequently in data sets, machine learning algorithms, such as A-Priori or Bayesian algorithms, can discover these associations. Using some criteria to determine a direction of the association to produce "rules" of the form "if A then B", conditionals can be generated as if A is the case in a state then if B is possible in the state then it is the state; or as if A is the case in an initial state then if B is possible in the new state the B will in the new state. These two forms correspond to two different usages of conditionals: as information space constrains and as change mechanism. As it can be observed, conditional consequences only apply if their pre-conditions are met.

In embodiments, a simplified version of conditional A>B (a "default conditional" hereinafter) can be used to calculate the initial belief representation archetypes ($K_0$). Default conditionals are represented using the following equation EQ4:

$$K=\ldots \{B:A \text{ is possible with respect to } K\} \quad [EQ4]$$

The following EQ5 summarizes a more complex equation to review $K_t$ with A using several conditionals A>B:

$$K_{t+1}=\{A\}\cup\{X:X \text{ is entailed by } K_t \text{ and } X \text{ is possible with respect to } K_{t+1}\}\cup \ldots \{B:A \text{ is entailed by } K_{t+1} \text{ and } X \text{ is possible with respect to } K_{t+1}\} \quad [EQ5]$$

where A, X, B, could be any logical combinations, such as conjunction, disjunction, negation, implication, of the relationship of symbols with data values.

In embodiments, conditionals can model different kinds of operations such as behaviors, cause-and-effect and other loose if-then relations, as well as hypothetical considerations. Conditional rules are not procedural like the rules of rule-based engines; they are instead laws that constrain the solution spaces and transitions between states. They are usually empirical (e.g., when they represent the opinions of entities), counterfactuals (e.g., to analyze hypothetical situations); and, in some embodiments, they can be used to model rational or irrational beliefs and behaviors.

In common mathematics, functions constrain the values of variables over space and time. Belief data model functions constrain the values of information states over time and spaces by means of conditionals. In common mathematics, the next particle position is described using differentials over its current position. In belief data models, the next state value is described using conditionals over its current state. Also, in linear algebra recursive equations describe constraints over the variables values. In belief data models, recursive equations also can be used with conditionals to constrain the variables' states.

In embodiments, equations may be formed and combined in multiple ways to express many operations on beliefs and behaviors. For example, an equation to describe that Thomas believes in X and has behaviors Y can be written as:

$$\text{Thomas}=X_{beliefs}+Y_{behaviors}$$

where X could be a complex information expression and Y could be a large collection of conditionals. The X and Y part of the equations might refer to Thomas and the elimination of such variable from X and Y will correspond to the form of calculation of a belief data model operation.

In embodiments, the resolved solution of such equations may produce multiple alternatives. For example, Thomas having two alternative states can be expressed in the following form:

$$\text{Thomas}=X^1_{beliefs}+Y^1_{behaviors} \text{ or } \text{Thomas}=X^2_{beliefs}+Y^2_{behaviors}.$$

This disjunction represents Thomas' belief representation.

In embodiments, systems of equations may be used to deal with multiple entities. For example:

$$Mary = X^0_{beliefs} + Y^0_{behaviors} \text{ and } Thomas = X^1_{beliefs} + Y^1_{behaviors}$$

In embodiments, interacting equations can model more complex situations. For example, if Mary was to believe B depending on Thomas believing A, the situation could be described as:

$$Thomas = X_{beliefs} + Y_{behaviors} \text{ and } Mary = not(B) + (A >_{Thomas} B).$$

Here, even if Thomas believes A, Mary will not believe B since she already believes not(B)—if it weren't the case, then Mary will end up believing B. In embodiments, these multiple belief representations can be represented as belief data models.

Figure 1:
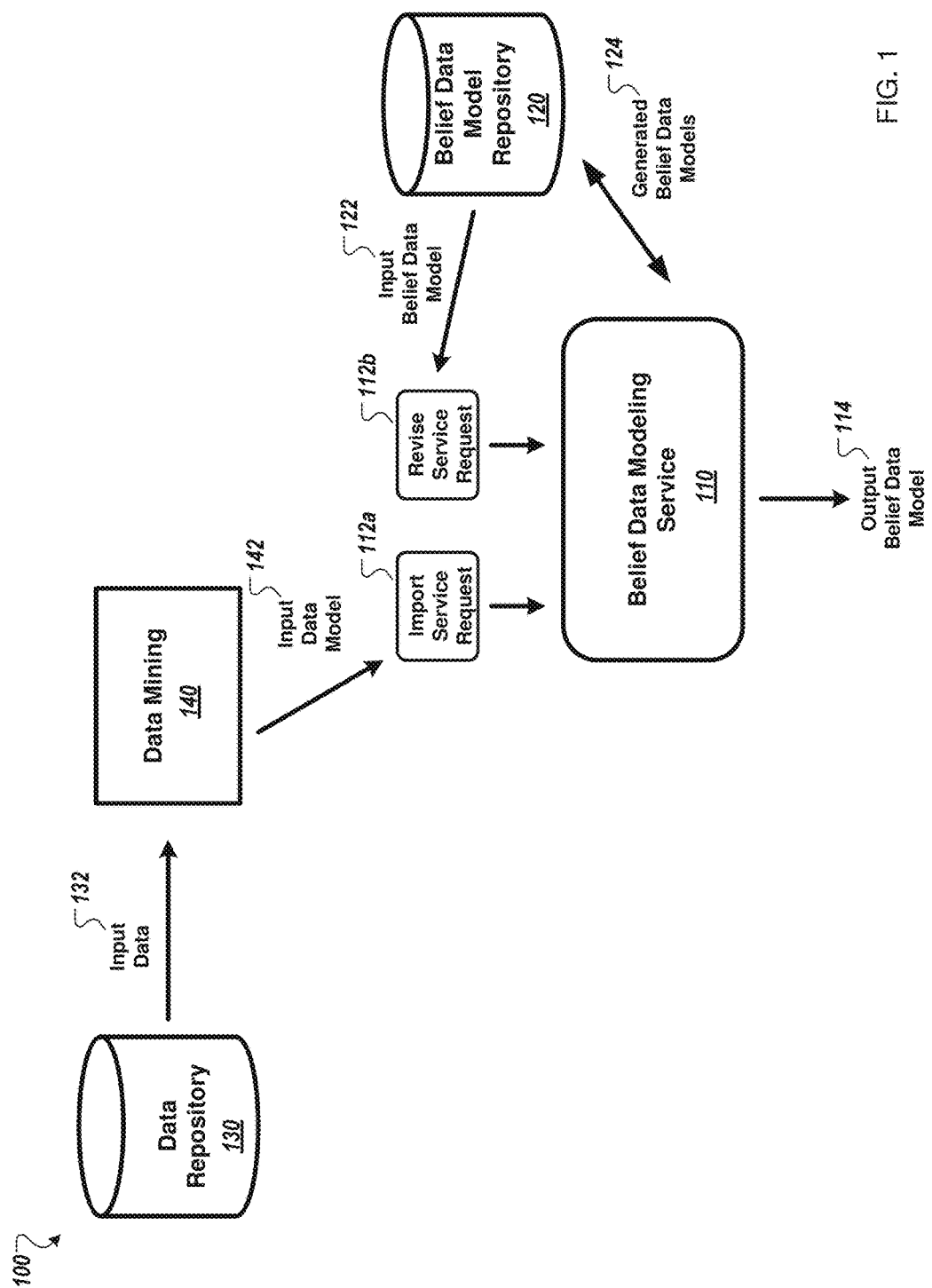
FIG. 1 illustrates an example system that can be configured to implement a belief data modeling service for representing and operating belief models data in accordance with some embodiments discussed herein.

FIG. 1 illustrates an example system 100 that can be configured to implement a belief data modeling service for representing and operating belief models data. In embodiments, a belief data modeling service 110 is configured to receive belief data modeling service requests (112) and to generate an output belief data model 114 in response to receiving a belief data modeling service request. In embodiments, each belief data modeling service request 112 includes an input data model representing a set of data, a set of input parameters including at least one of observational data and modeling data, and an operation to be applied to the input data model using the input parameters.

In some embodiments, the belief data modeling service request 112 may be an import service request 112a, representing a request to create a new belief data model by applying an import operation to an input data model 142 derived from an unstructured or structured data repository 130 using one or a combination of data mining and machine learning methods 140. Creating a new belief data model will be described in detail with reference to method 200 in FIG. 2.

In some embodiments, the belief data modeling service request 112 may include one or a combination of operations to be applied to an input belief data model 122, including revision to revise the input data model, contraction to contract the input data model, acceptance of the input parameters to be determined for the input data model, consistency to be determined between the input data model and the input parameters, explanation of the input parameters, diagnosis of a discrepancy between the input data model and the input parameters, and at least one of a set of input data model modification requests. In some embodiments, the input belief data model 122 may be a stored previously generated belief data model 124 that is retrieved from a belief data model repository 120. An exemplary belief data modeling request that includes an input belief data model 122 is a revise service request 112b; generating an output data model 122 in response to a revise service request 112b will be described in detail with reference to method 500 in FIG. 5.

Figure 2:
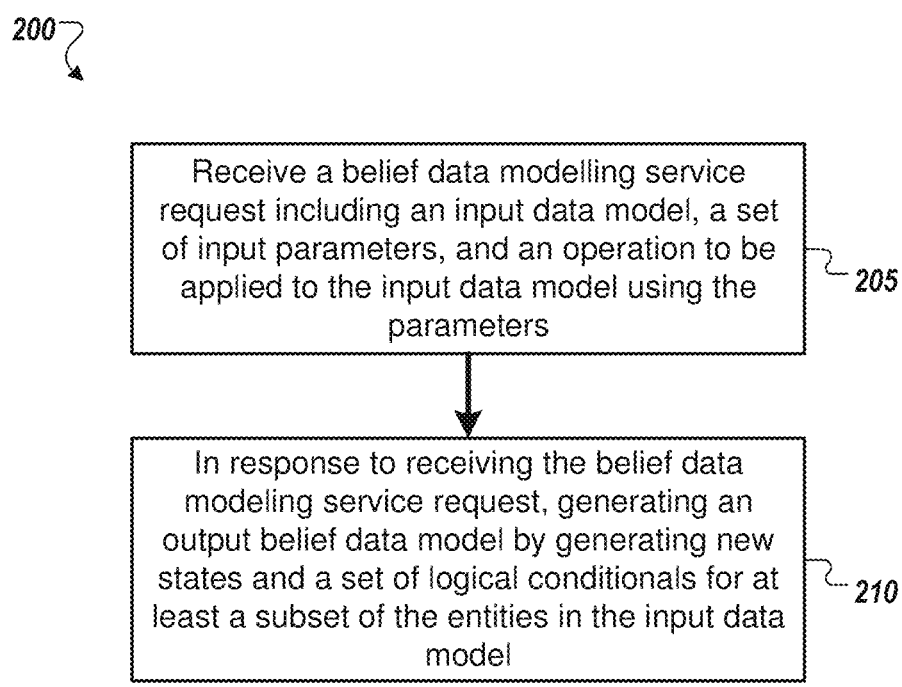
FIG. 2 is a flow diagram of an example method for implementing a belief data modeling service in accordance with some embodiments discussed herein.

FIG. 2 is a flow diagram of an example method 200 for implementing a belief data modeling service. For convenience, the method 200 will be described with respect to a system that includes one or more computing devices and performs the method 200. Specifically, the method 200 will be described with respect to processing of an input service request 112 by belief data modeling service 110.

In embodiments, the system receives 205 a belief data modelling service request including an input data model, a set of input parameters, and an operation to be applied to the input data model using the parameters. As previously described, for an import service request the input data model 142 may have been derived using one or a combination of data mining and machine learning methods, for example, a sequence mining method, a clustering discovering method wherein the entity descriptions are specific clusters associated to generated identifiers, a supervised classification method wherein the entity description is a class logical description and the entity identifier is the class identifier, a sentiment analysis method wherein the entity descriptions correspond to a sentiment logical description of the entity, a topic modeling algorithm, a method that produces state transition models, a Markov Model calculation, a Bayes network calculation algorithm method, and a Kalman filtering algorithm. In some embodiments, the input data model may be derived using a manually or mechanically operated model creation tool capable of creating descriptions of entities and/or rules Those skilled in the art will recognize that there are a variety of methods for deriving the input data model 142, and the choice of method is not critical to the invention.

In embodiments, the system generates 210 an output data model 114 of the set of entities in the input data model 142 by generating new states and a set of logical conditionals that constrain the states for at least a subset of the entities.

Figure 3:
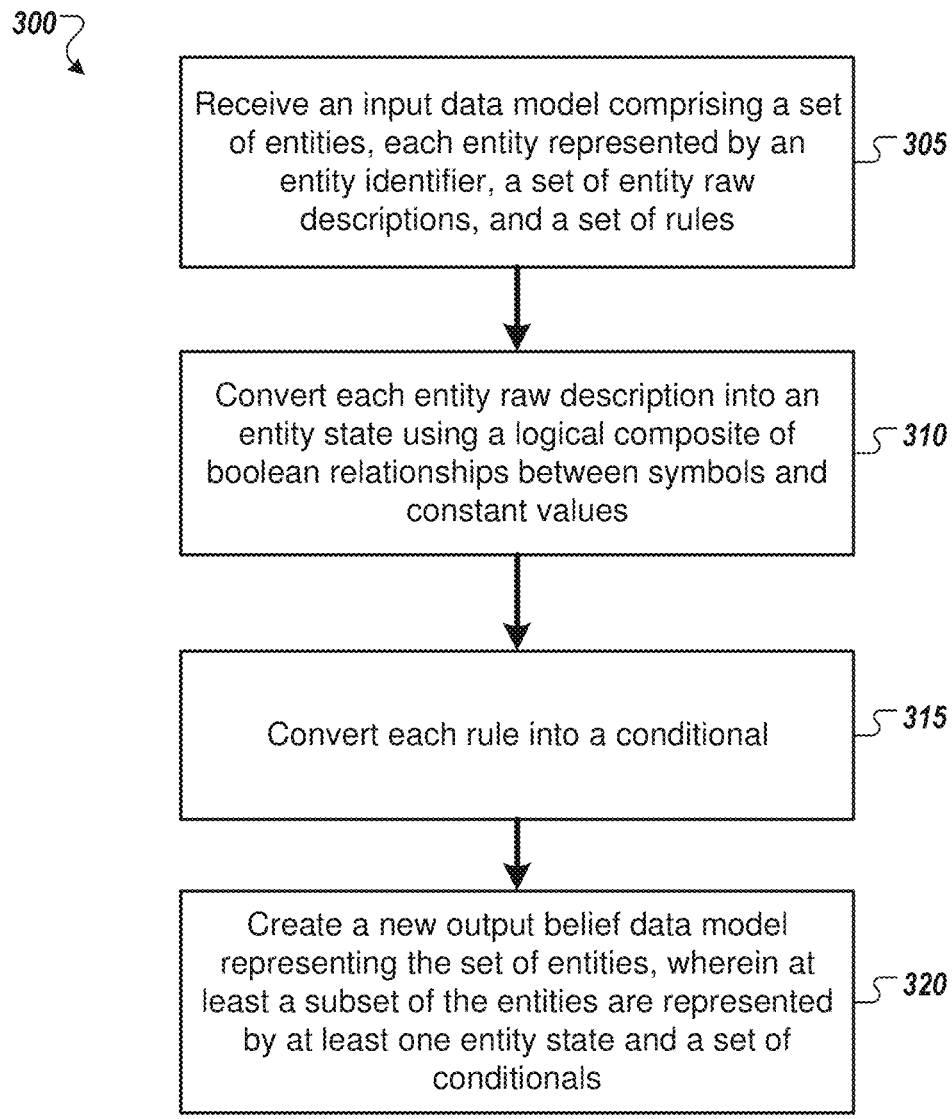
FIG. 3 is a flow diagram of an example method for creating a new output belief data model from an input data model derived using a conventional machine learning method in accordance with some embodiments discussed herein.

FIG. 3 is a flow diagram of an example method 300 for creating a new output belief data model from an input data model derived using a conventional machine learning or data mining method. For convenience, the method 300 will be described with respect to a system that includes one or more computing devices and performs the method 300. Specifically, the method 300 will be described with respect to generating an output belief data model 114 by belief data modeling service 110.

In embodiments, the system receives 305 an input data model comprising a set of entities, each entity represented by an entity identifier, a set of entity raw descriptions, and a set of rules.

In embodiments, the system converts 310 each entity raw description into an entity state using a logical composite of boolean relationships between symbols and constant values.

In embodiments, the system converts 315 each rule into a logical conditional representation (conditional) that prescribes that if the logical conjunction of the rule cause relationships (rule pre-conditions) is logically fulfilled in a state, and the logical conjunction of the rule consequence relationships (rule post-conditions) is logically consistent with the state, then the conjunction of the consequences should be logically fulfilled in the state.

In embodiments, the system creates 320 the new output belief data model, representing the set of entities in the input data model, where at least a subset of the entities are represented by at least one entity state and a set of conditionals.

Figure 4:
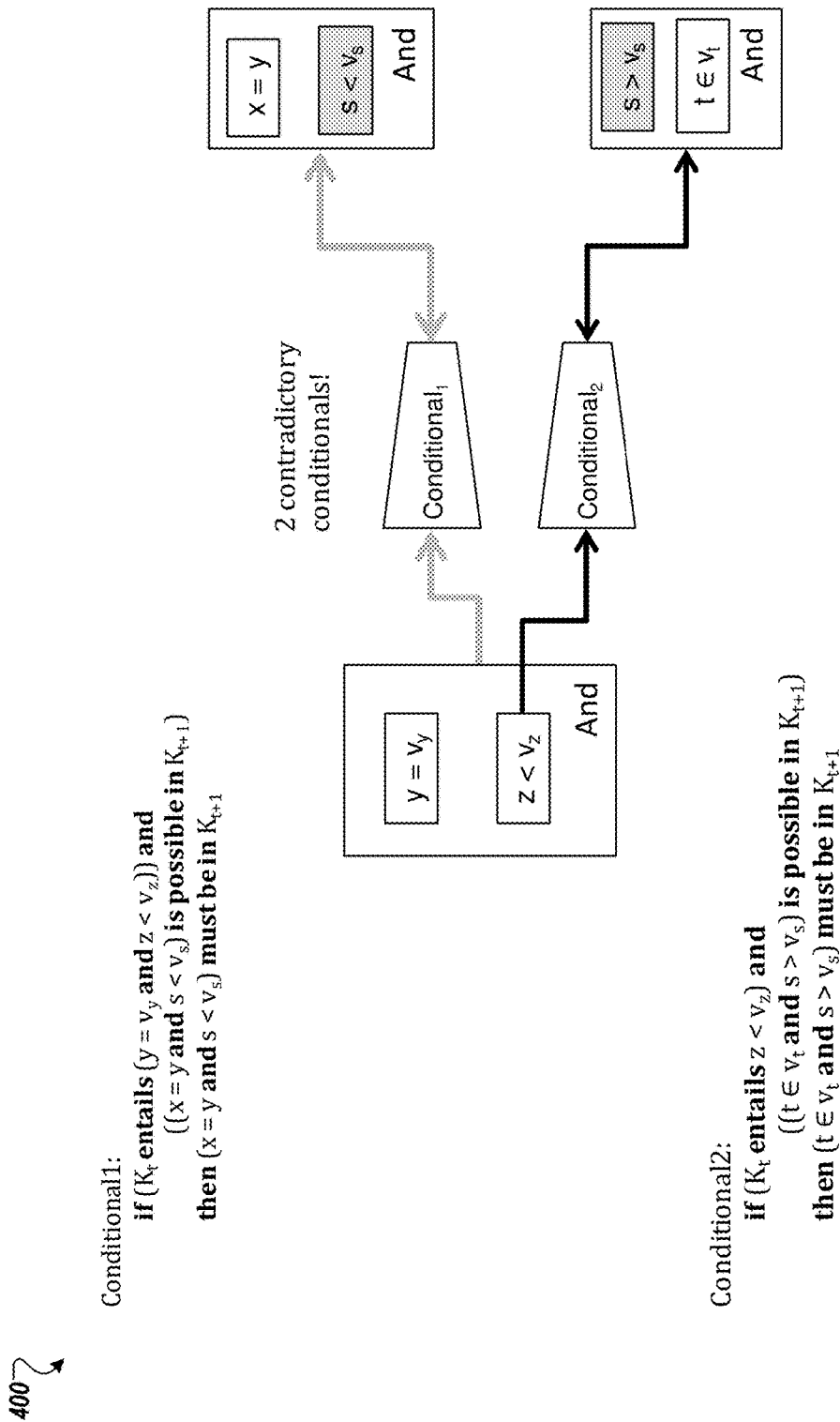
FIG. 4 depicts an exemplary scenario in which two rules are converted into two conditionals in accordance with some embodiments discussed herein.

FIG. 4 depicts an exemplary scenario 400 in which two rules are converted into a two contradictory conditionals. The scenario 400 is depicted for illustration and not for limitation.

Scenario 400 illustrates the way the relationship between symbols and data values and other symbols, conditionals are related. The relationship between symbols and other values could be of different nature. If conditionals are 'enforceable' (that is 'triggered') by the fulfillment of their preconditions, then they constrain the values of symbols in the new states.

Figure 5:
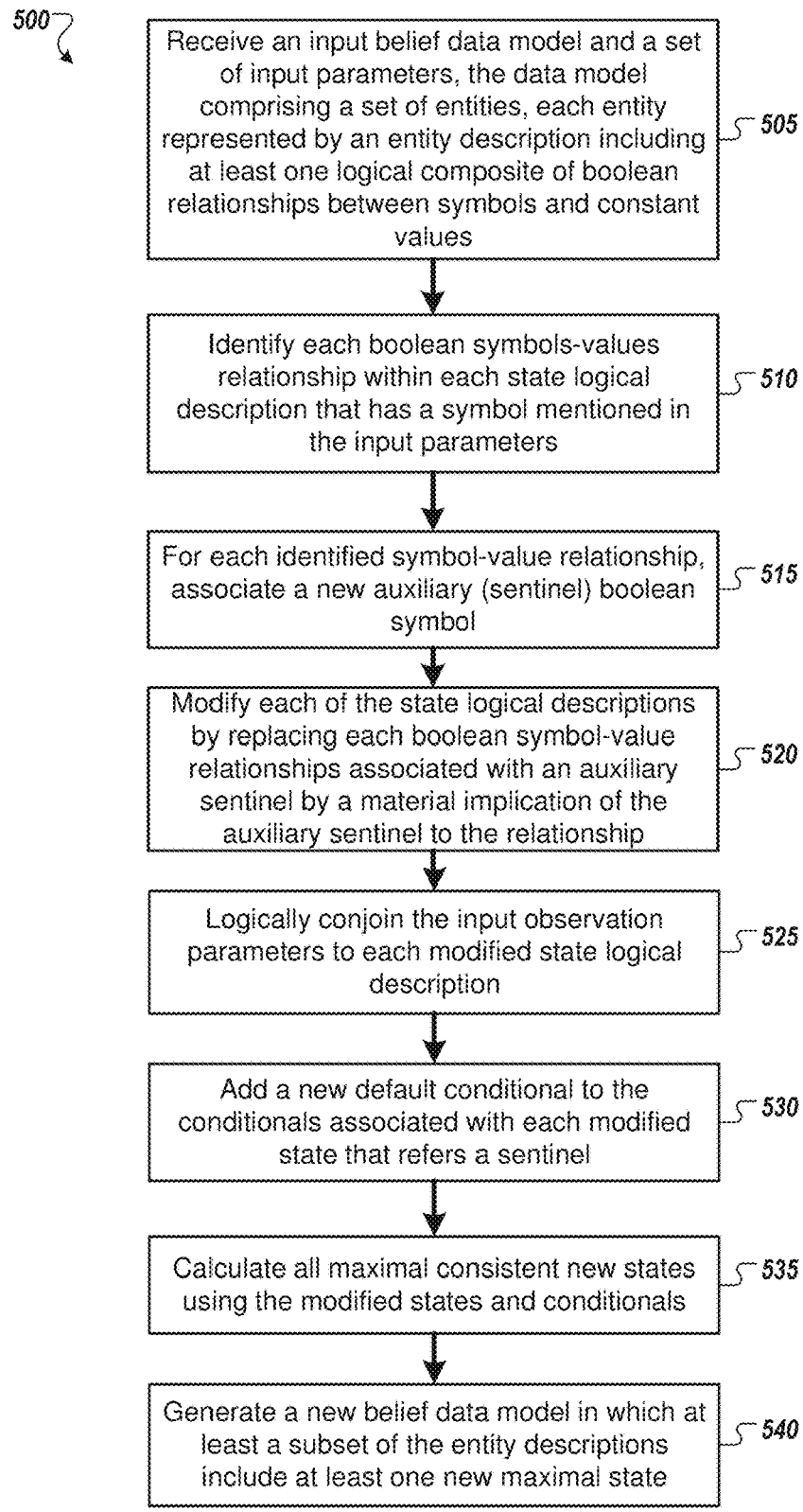
FIG. 5 is a flow diagram of an example method for revising a previously generated belief model in accordance with some embodiments discussed herein.

FIG. 5 is a flow diagram of an example method 500 for revising a previously generated belief model. For convenience, the method 500 will be described with respect to a system that includes one or more computing devices and performs the method 500. Specifically, the method 500 will be described with respect to will be described with respect to generating an output belief data model 114 by belief data modeling service 110.

In embodiments, the system receives 505 a set of input data parameters and a previously generated belief data model, where each model entity includes at least one state representation including a logical composite of boolean relationships between symbols and constant values, and a set of logical conditionals.

In embodiments, the system identifies 510 each boolean symbols-values relationship within each state logical description that has a symbol mentioned in the input parameters.

In embodiments, the system associates 515 a new auxiliary (sentinel) boolean symbol to each identified symbol-value relationship.

In embodiments, the system modifies 520 each of the state logical descriptions by replacing each boolean symbol-value relationship associated with an auxiliary sentinel by a material implication of the auxiliary sentinel to the relationship.

In embodiments, the system logically conjoins 525 the input observation parameters to each modified state logical description.

In embodiments, the system adds 530 a new default conditional to the conditionals associated with each modified state that refers a sentinel, wherein the new default conditional prescribes that if it is possible for such sentinel symbol value to be true in an arbitrary state then it must be so in such state.

In embodiments, the system calculates 535 all maximal consistent new states, wherein each maximal consistent new state is defined as a logically consistent conjunction of a modified state together with all the post-conditions of any longest combination of those conditionals for which their preconditions are fulfilled by the new state.

In embodiments, the system generates 540 a new belief data model wherein at least a subset of the entity descriptions include at least one new maximal state and the conditionals of its respective unique originating state.

Figure 6:
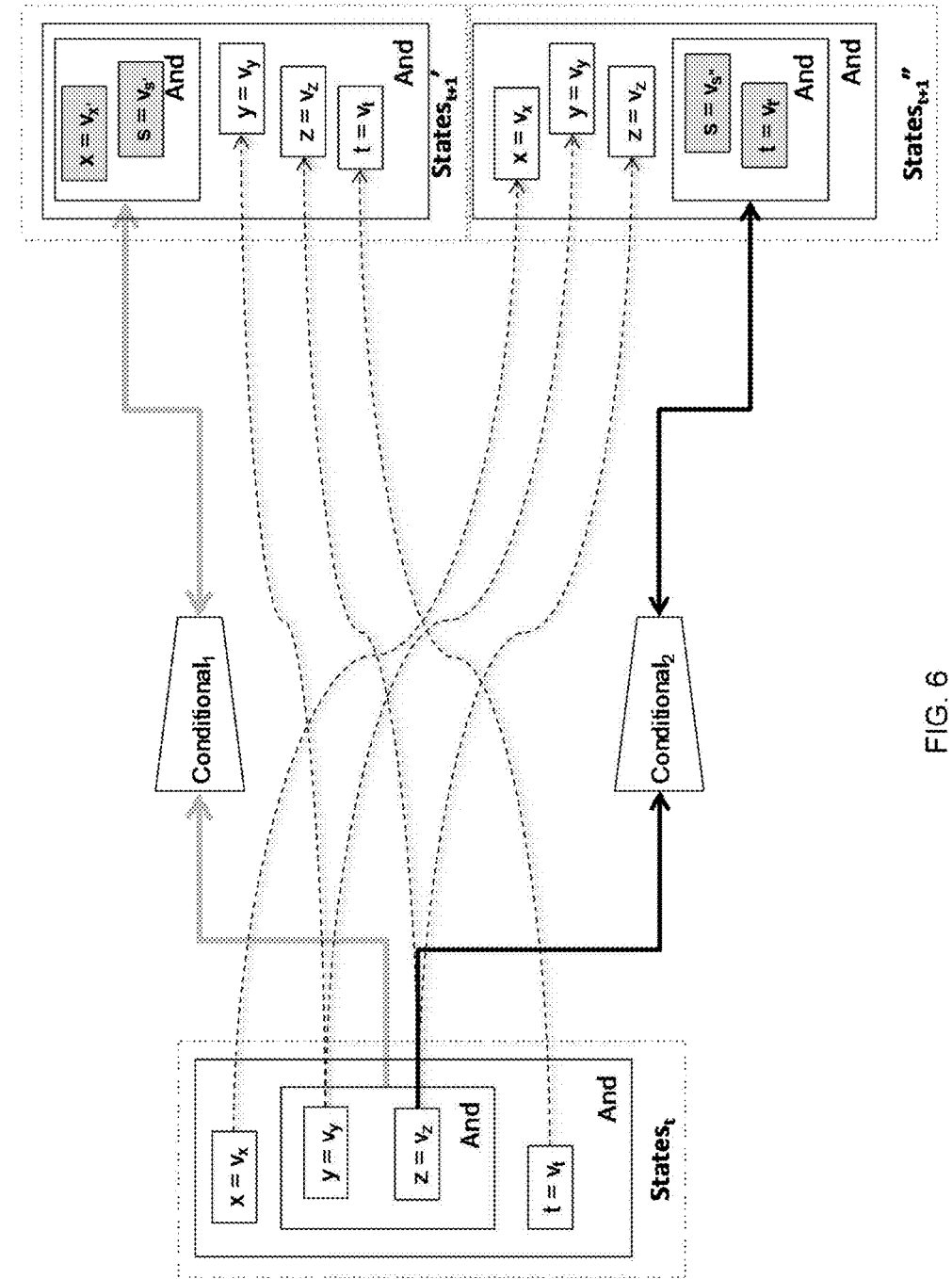
FIG. 6 depicts an exemplary scenario in which multiple states are generated when the effects of conditionals are contradictory in accordance with some embodiments discussed herein.

FIG. 6 depicts an exemplary scenario 600 in which multiple states are generated when the effects of conditionals are contradictory. The scenario 600 is depicted for illustration and not for limitation.

In the figure, dotted lines indicate the symbol-values relationships that are preserved, whereas the solid lines show change. The two conditionals are contradictory in the new values of s. Conditional$_1$ also changes x whereas Conditional$_2$ changes t. Solid light solid lines are the changes executed by Conditional$_1$ whereas the dark solid lines are the changes produced by rule$_2$. In some embodiments, expressions where the variables occur may be highly complex logical expressions and/or plain conjunctions as it is exemplified in the exemplary scenario.

Figure 7:
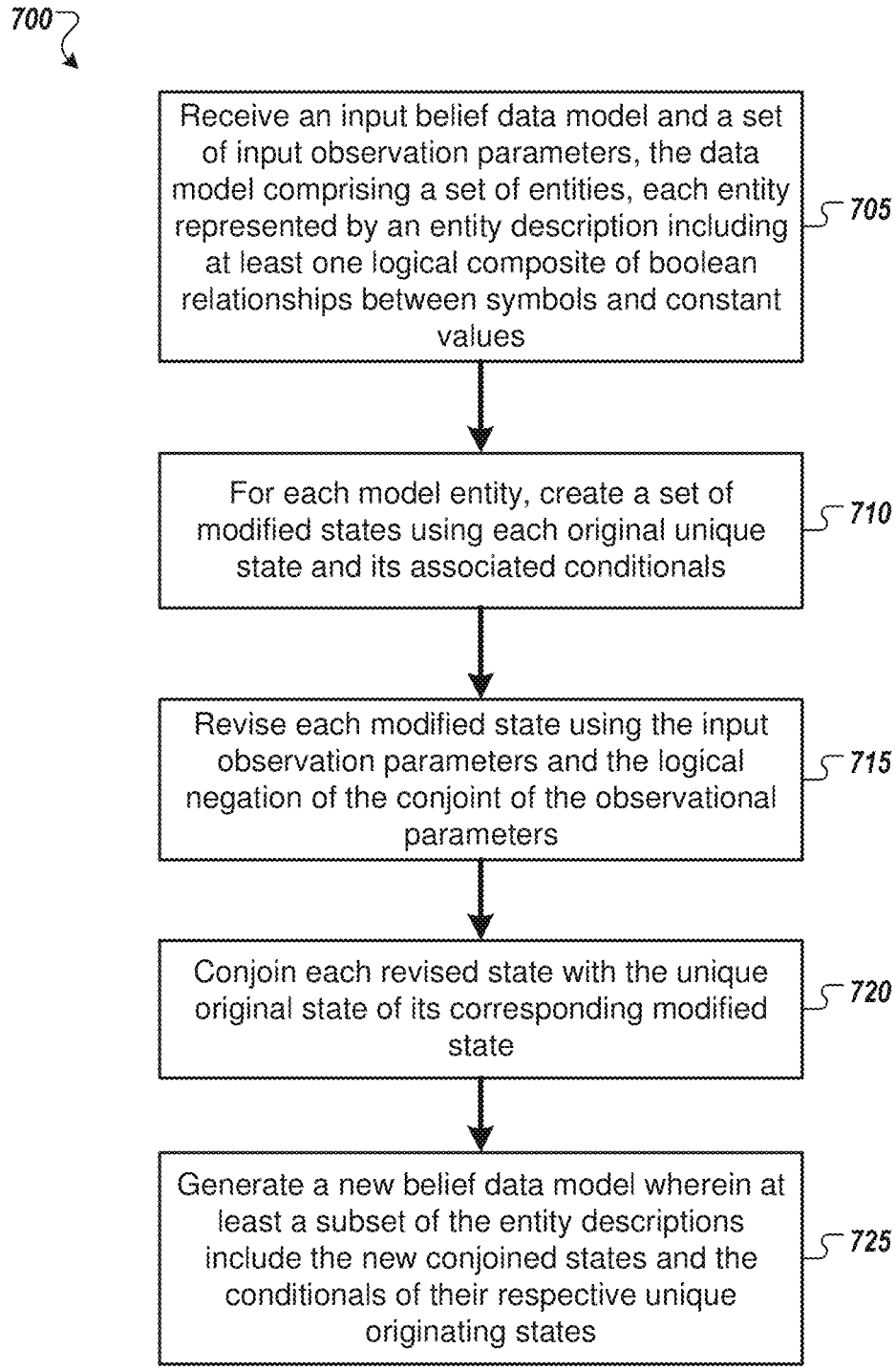
FIG. 7 is a flow diagram of an example method for contracting a previously generated belief model in accordance with some embodiments discussed herein.

FIG. 7 is a flow diagram of an example method 700 for contracting a previously generated belief model. For convenience, the method 700 will be described with respect to a system that includes one or more computing devices and performs the method 700. Specifically, the method 700 will be described with respect to will be described with respect to generating an output belief data model 114 by belief data modeling service 110.

In embodiments, the system receives 705 input observation parameters and a belief data model where each model entity description includes at least one state including a logical composite of boolean relationships between symbols and constant values and the state constraining conditionals.

In embodiments, the system creates 710 a set of modified states using each original unique state and its associated conditionals for each model entity.

In embodiments, the system revises 715 each modified state using the input observation parameters and the logical negation of the conjoint of the observational parameters.

In embodiments, the system conjoins 720 each revised state with the unique originating state of its corresponding modified state.

In embodiments, the system generates 725 a new belief data model wherein at least a subset of the entity descriptions include the new conjoined states and the conditionals of their respective unique originating states.

Figure 8:
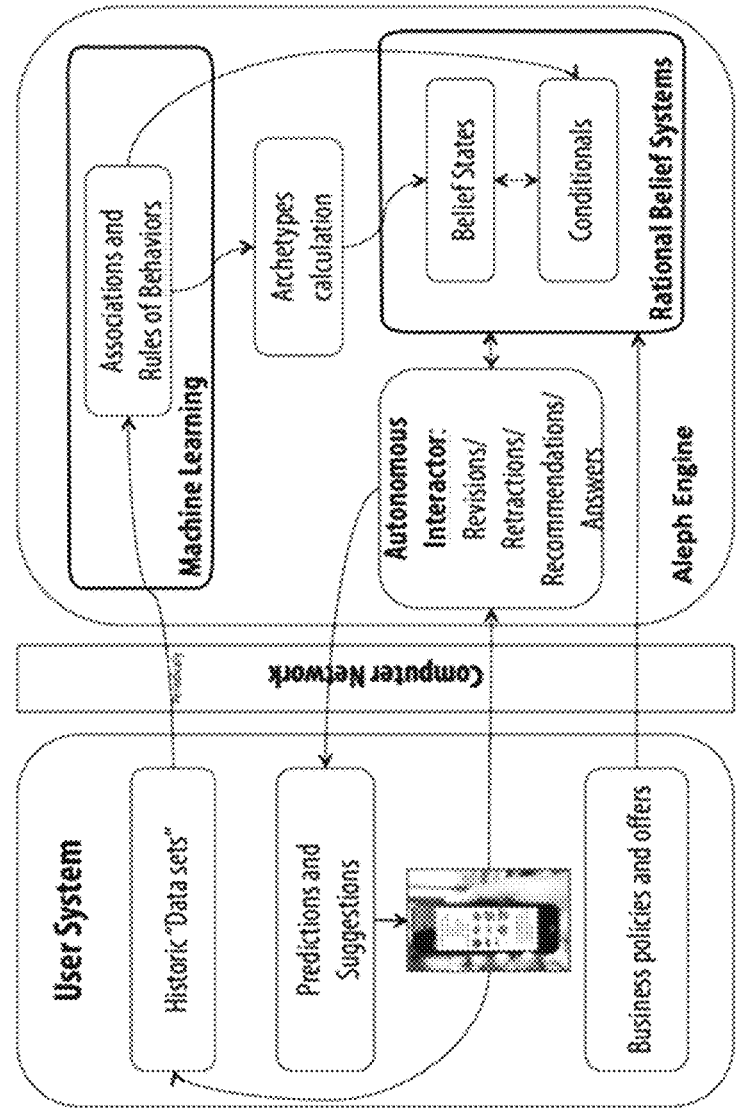
FIG. 8 depicts an exemplary shopping use scenario in which belief data models are used to predict the evolution of the shopping experience for customers over multiple visits to a business in accordance with some embodiments discussed herein.

FIG. 8 depicts an exemplary shopping use scenario 800 in which belief data models are used to predict the evolution of the shopping experience for customers over multiple visits to a business. The scenario 800 is depicted for illustration and not for limitation.

In scenario 800, the Historic "Data sets" are analyzed with machine learning algorithms to discover associations and behaviors as the ones generated by the A-Priori algorithm described, for example, in Rakesh, Agrawal and Ramakrishnan Srikant: *Fast algorithms for mining association rules in large databases.* Proceedings of the 20th International Conference on Very Large Data Bases, VLDB, pages 487-499, Santiago, Chile, September 1994 or any other algorithm that discovers cause-and-effect relations. These behavior rules are used to calculate the original archetypes.

FIG. 9 depicts an exemplary Market-Basket analysis 900 in which belief data models are used to find customer preferences of products and selections. The scenario 900 is depicted for illustration and not for limitation.

In embodiments, the Market-Basket Analysis (MBA) can be used to extract the combinations that more commonly appear in collections of transactions. In scenario 900, belief data models are used to transform the combinations into conditional behaviors and then use them to generate solutions for adapting to forthcoming observations.

FIG. 10 shows a schematic block diagram of circuitry 1000, some or all of which may be included in, for example, belief data modeling service system 100. As illustrated in FIG. 10, in accordance with some example embodiments, circuitry 1000 can include various means, such as processor 1002, memory 1004, communications module 1006, and/or input/output module 1008. As referred to herein, "module" includes hardware, software and/or firmware configured to perform one or more particular functions. In this regard, the means of circuitry 1000 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 1004) that is executable by a suitably configured processing device (e.g., processor 1002), or some combination thereof.

Processor 1002 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 10 as a single processor, in some embodiments processor 1002 comprises a plurality of processors. The plurality of processors may be embodied on a single computing device or may be distributed across a plurality of computing devices collectively configured to function as circuitry 1000. The plurality of processors may be in operative communication with each other and may be collectively configured to perform one or more functionalities of circuitry 1000 as described herein. In an example embodiment, processor 1002 is configured to execute instructions stored in memory 1004 or otherwise accessible to processor 1002. These instructions, when executed by processor 1002, may cause circuitry 1000 to perform one or more of the functionalities of circuitry 1000 as described herein.

Whether configured by hardware, firmware/software methods, or by a combination thereof, processor 1002 may comprise an entity capable of performing operations according to embodiments of the present invention while configured accordingly. Thus, for example, when processor 1002 is embodied as an ASIC, FPGA or the like, processor 1002 may comprise specifically configured hardware for conducting one or more operations described herein. Alternatively, as another example, when processor 1002 is embodied as an executor of instructions, such as may be stored in memory 1004, the instructions may specifically configure processor 1002 to perform one or more algorithms and operations described herein, such as those discussed in connection with FIGS. 2-3 and 5.

Memory 1004 may comprise, for example, volatile memory, non-volatile memory, or some combination thereof. Although illustrated in FIG. 10 as a single memory, memory 1004 may comprise a plurality of memory components. The plurality of memory components may be embodied on a single computing device or distributed across a plurality of computing devices. In various embodiments, memory 1004 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 1004 may be configured to store information, data (including analytics data), applications, instructions, or the like for enabling circuitry 1000 to carry out various functions in accordance with example embodiments of the present invention. For example, in at least some embodiments, memory 1004 is configured to buffer input data for processing by processor 1002. Additionally or alternatively, in at least some embodiments, memory 1004 is configured to store program instructions for execution by processor 1002. Memory 1004 may store information in the form of static and/or dynamic information. This stored information may be stored and/or used by circuitry 1000 during the course of performing its functionalities.

Communications module 1006 may be embodied as any device or means embodied in circuitry, hardware, a computer program product comprising computer readable program instructions stored on a computer readable medium (e.g., memory 1004) and executed by a processing device (e.g., processor 1002), or a combination thereof that is configured to receive and/or transmit data from/to another device, such as, for example, a second circuitry 1000 and/or the like. In some embodiments, communications module 1006 (like other components discussed herein) can be at least partially embodied as or otherwise controlled by processor 1002. In this regard, communications module 1006 may be in communication with processor 1002, such as via a bus. Communications module 1006 may include, for example, an antenna, a transmitter, a receiver, a transceiver, network interface card and/or supporting hardware and/or firmware/software for enabling communications with another computing device. Communications module 1006 may be configured to receive and/or transmit any data that may be stored by memory 1004 using any protocol that may be used for communications between computing devices. Communications module 1006 may additionally or alternatively be in communication with the memory 1004, input/output module 1008 and/or any other component of circuitry 1000, such as via a bus.

Input/output module 1008 may be in communication with processor 1002 to receive an indication of a user input and/or to provide an audible, visual, mechanical, or other output to a user. Some example visual outputs that may be provided to a user by circuitry 1000 are discussed in connection with FIG. 1. As such, input/output module 1008 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 1000 is embodied as a server or database, aspects of input/output module 1008 may be reduced as compared to embodiments where circuitry 1000 is implemented as an end-user machine or other type of device designed for complex user interactions. In some embodiments (like other components discussed herein), input/output module 1008 may even be eliminated from circuitry 1000. Alternatively, such as in embodiments wherein circuitry 1000 is embodied as a server or database, at least some aspects of input/output module 1008 may be embodied on an apparatus used by a user that is in communication with circuitry 1000. Input/output module 1008 may be in communication with the memory 1004, communications module 1006, and/or any other component(s), such as via a bus. Although more than one input/output module and/or other component can be included in circuitry 1000, only one is shown in FIG. 10 to avoid overcomplicating the drawing (like the other components discussed herein).

Belief data modeling service module 1010 may also or instead be included and configured to perform the functionality discussed herein related to the belief data modeling service discussed above. In some embodiments, some or all of the functionality of belief data modeling service may be performed by processor 1002. In this regard, the example processes and algorithms discussed herein can be performed by at least one processor 1002 and/or belief data modeling service module 1010. For example, non-transitory computer readable media can be configured to store firmware, one or more application programs, and/or other software, which include instructions and other computer-readable program code portions that can be executed to control each processor (e.g., processor 1002 and/or belief data modeling service module 1010) of the components of system 100 to implement various operations, including the examples shown above. As such, a series of computer-readable program code portions are embodied in one or more computer program products and can be used, with a computing device, server, and/or other programmable apparatus, to produce machine-implemented processes.

Any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 100. In some embodiments, one or more external systems (such as a remote cloud computing and/or data storage system) may also be leveraged to provide at least some of the functionality discussed herein.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 1002 and/or belief data modeling service module 1010 discussed above with reference to FIG. 10, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 1004) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
one or more computers and one or more storage devices storing instructions that are operable, when executed by the one or more computers, to cause the one or more computers to provide a belief data modeling service for representing and operating belief models data, wherein the belief data modeling service performs operations comprising:
receiving a belief data modeling service request including an input data model representing a set of data, a set of input parameters including at least one of observational data and modeling data, and an operation to be applied to the input data model using the input parameters, wherein the input data model comprises a set of entities, each of the entities being associated with an entity identifier and at least one state, and wherein the operation includes at least one of a group of operations including import to create a new belief data model using the input data model, revision to revise the input data model, contraction to contract the input data model, acceptance of the input parameters to be determined for the input data model, consistency to be determined between the input data model and the input parameters, explanation of the input parameters, diagnosis of a discrepancy between the input data model and the input parameters, and at least one of a set of input data model modification requests; and
in response to receiving the belief data modeling service request, generating an output belief data model of the set of entities by generating new states and a set of logical conditionals that constrain the states for at least a subset of the entities, wherein each new state is represented by a logical composite of boolean relationships between symbols and constant values, wherein each logical conditional prescribes that if certain conditions are logically fulfilled in a state, and certain conditions are consistent in a state, then conditional consequences should be fulfilled in a reference state, and wherein the generating of new states and logical conditionals includes applying the input operation to the input data model.

2. The system of claim 1, wherein the data modeling service request includes the import operation, wherein the input data model was derived previously using a machine-learning or data mining method, wherein each of the set of entities is represented by an entity identifier, a set of entity raw descriptions, and a set of rules, and wherein generating the output belief data model comprises:
converting each entity raw description into an entity state using a logical composite of boolean relationships between symbols and constant values;
converting each rule into a logical conditional representation (conditional) that prescribes that if the logical conjunction of the rule cause relationships (rule pre-conditions) is logically fulfilled in a state, and the logical conjunction of the rule consequence relationships (rule post-conditions) is logically consistent with the state, then the conjunction of the consequences should be logically fulfilled in the state; and creating a new output belief data model representing the set of entities, wherein at least a subset of the entities are represented by at least one entity state and a set of conditionals.

3. The system of claim 2, wherein creating the new output belief data model is preceded by generating archetypes, wherein generating archetypes includes deriving the entity states by converting each rule into a logical default conditional, and wherein generating archetypes comprises:

converting each rule into a default conditional prescribing that if the logical conjunction of the rule pre-conditions and the rule post-conditions is logically consistent in a state, then this conjunction should be contained in the state; and calculating the collection of all maximal consistent new states each defined as the logically consistent conjunction of all the post-conditions of any longest combination of those default conditionals for which all their preconditions are fulfilled by the new state.

4. The system of claim 2, wherein the input data model was derived using one of a set of methods including a sequence mining method, a clustering discovering method wherein the entity descriptions are specific clusters associated to generated identifiers, a supervised classification method wherein the entity description is a class logical description and the entity identifier is the class identifier, a sentiment analysis method wherein the entity descriptions correspond to a sentiment logical description of the entity, a topic modeling algorithm, a method that produces state transition models, a Markov Model calculation, a Bayes network calculation algorithm method, and a Kalman filtering algorithm.

5. The system of claim 2, wherein the input data model was derived using a manually or mechanically operated model creation tool capable of creating descriptions of entities and/or rules.

6. The system of claim 1, wherein the data modeling service request includes the revision of the input data model operation, wherein the input data model is a previously generated belief data model, wherein each model entity includes at least one state representation including a logical composite of boolean relationships between symbols and constant values, and a set of logical conditionals, and wherein generating the output data model comprises:

identifying each boolean symbols-values relationship within each state logical description that has a symbol mentioned in the input parameters included in the data modeling service request;

for each identified symbol-value relationship, associating a new auxiliary (sentinel) boolean symbol;

modifying each of the state logical descriptions by replacing each boolean symbol-value relationship associated with an auxiliary sentinel by a material implication of the auxiliary sentinel to the relationship;

logically conjoining the input observation parameters to each modified state logical description;

adding a new default conditional to the conditionals associated with each modified state that refers a sentinel, wherein the new default conditional prescribes that if it is possible for such sentinel symbol value to be true in an arbitrary state then it must be so in such state;

calculating all maximal consistent new states, wherein each maximal consistent new state is defined as a logically consistent conjunction of a modified state together with all the post-conditions of any longest combination of those conditionals for which their pre-conditions are fulfilled by the new state; and generating a new belief data model wherein at least a subset of the entity descriptions include at least one new maximal state and the conditionals of its respective unique originating state.

7. The system of claim 1, wherein the data modeling service request includes the contraction of the input data model operation, wherein the input data model is a previously generated belief data model wherein each model entity description includes at least one state including a logical composite of boolean relationships between symbols and constant values and the state constraining conditionals, and wherein generating the output data model comprises:

for each model entity, creating a set of modified states using each original unique state and its associated conditionals;

revising each modified state using the input observation parameters included in the data modeling service request and the logical negation of the conjoint of the observational parameters;

conjoining each revised state with the unique originating state of its corresponding modified state; and generating a new belief data model wherein at least a subset of the entity descriptions include the new conjoined states and the conditionals of their respective unique originating states.

8. The system of claim 1, wherein some of the conditionals specify business, theoretical laws or counterfactual conditionals.

9. A computer program product, stored on a non-transitory computer readable medium, comprising instructions that when executed on one or more computers cause the one or more computers to perform operations implementing a belief data modeling service for representing and operating belief models of unstructured data, wherein the belief data modeling service performs operations comprising:

receiving a belief data modeling service request including an input data model representing a set of data, a set of input parameters including at least one of observational data and modeling data, and an operation to be applied to the input data model using the input parameters, wherein the input data model comprises a set of entities, each of the entities being associated with an entity identifier and at least one state, and wherein the operation includes at least one of a group of operations including import to create a new belief data model using the input data model, revision to revise the input data model, contraction to contract the input data model, acceptance of the input parameters to be determined for the input data model, consistency to be determined between the input data model and the input parameters, explanation of the input parameters, diagnosis of a discrepancy between the input data model and the input parameters, and at least one of a set of input data model modification requests; and in response to receiving the belief data modeling service request, generating an output belief data model of the set of entities by generating new states and a set of logical conditionals that constrain the states for at least a subset of the entities, wherein each new state is represented by a logical composite of boolean relationships between symbols and constant values, wherein each logical conditional prescribes that if certain conditions are logically fulfilled in a state, and certain conditions are consistent in a state, then conditional consequences should be fulfilled in a reference state, and wherein the generating of new states and logical conditionals includes applying the input operation to the input data model.

10. The computer program product of claim 9, wherein the data modeling service request includes the import operation, wherein the input data model was derived previously using a machine-learning or data mining method, wherein each of the set of entities is represented by an entity identifier, a set of entity raw descriptions, and a set of rules, and wherein generating the output belief data model comprises:
converting each entity raw description into an entity state using a logical composite of boolean relationships between symbols and constant values;
converting each rule into a logical conditional representation (conditional) that prescribes that if the logical conjunction of the rule cause relationships (rule pre-conditions) is logically fulfilled in a state, and the logical conjunction of the rule consequence relationships (rule post-conditions) is logically consistent with the state, then the conjunction of the consequences should be logically fulfilled in the state; and
creating a new output belief data model representing the set of entities, wherein at least a subset of the entities are represented by at least one entity state and a set of conditionals.

11. The computer program product of claim 10, wherein creating the new output belief data model is preceded by generating archetypes, wherein generating archetypes includes deriving the entity states by converting each rule into a logical default conditional, and wherein generating archetypes comprises:
converting each rule into a default conditional prescribing that if the logical conjunction of the rule pre-conditions and the rule post-conditions is logically consistent in a state, then this conjunction should be contained in the state; and
calculating the collection of all maximal consistent new states each defined as the logically consistent conjunction of all the post-conditions of any longest combination of those default conditionals for which all their preconditions are fulfilled by the new state.

12. The computer program product of claim 10, wherein the input data model was derived using one of a set of methods including a sequence mining method, a clustering discovering method wherein the entity descriptions are specific clusters associated to generated identifiers, a supervised classification method wherein the entity description is a class logical description and the entity identifier is the class identifier, a sentiment analysis method wherein the entity descriptions correspond to a sentiment logical description of the entity, a topic modeling algorithm, a method that produces state transition models, a Markov Model calculation, a Bayes network calculation algorithm method, and a Kalman filtering algorithm.

13. The computer program product of claim 10, wherein the input data model was derived using a manually or mechanically operated model creation tool capable of creating descriptions of entities and/or rules.

14. The computer program product of claim 9, wherein the data modeling service request includes the revision of the input data model operation, wherein the input data model is a previously generated belief data model, wherein each model entity includes at least one state representation including a logical composite of boolean relationships between symbols and constant values, and a set of logical conditionals, and wherein generating the output data model comprises:
identifying each boolean symbols-values relationship within each state logical description that has a symbol mentioned in the input parameters included in the data modeling service request;
for each identified symbol-value relationship, associating a new auxiliary (sentinel) boolean symbol;
modifying each of the state logical descriptions by replacing each boolean symbol-value relationship associated with an auxiliary sentinel by a material implication of the auxiliary sentinel to the relationship;
logically conjoining the input observation parameters to each modified state logical description;
adding a new default conditional to the conditionals associated with each modified state that refers a sentinel, wherein the new default conditional prescribes that if it is possible for such sentinel symbol value to be true in an arbitrary state then it must be so in such state;
calculating all maximal consistent new states, wherein each maximal consistent new state is defined as a logically consistent conjunction of a modified state together with all the post-conditions of any longest combination of those conditionals for which their pre-conditions are fulfilled by the new state; and
generating a new belief data model wherein at least a subset of the entity descriptions include at least one new maximal state and the conditionals of its respective unique originating state.

15. The computer program product of claim 9, wherein the data modeling service request includes the contraction of the input data model operation, wherein the input data model is a previously generated belief data model wherein each model entity description includes at least one state including a logical composite of boolean relationships between symbols and constant values and the state constraining conditionals, and wherein generating the output data model comprises:
for each model entity, creating a set of modified states using each original unique state and its associated conditionals;
revising each modified state using the input observation parameters included in the data modeling service request and the logical negation of the conjoint of the observational parameters;
conjoining each revised state with the unique originating state of its corresponding modified state; and
generating a new belief data model wherein at least a subset of the entity descriptions include the new conjoined states and the conditionals of their respective unique originating states.

16. The computer program product of claim 9, wherein some of the conditionals specify business, theoretical laws or counterfactual conditionals.

17. A computer-implemented method for generating a new belief data model using an input data model derived using a machine-learning or data mining method, the method comprising:
receiving the input data model comprising a set of entities, wherein each of the set of entities is represented by an entity identifier, a set of entity raw descriptions, and a set of rules;

converting each entity raw description into an entity state using a logical composite of boolean relationships between symbols and constant values;

converting each rule into a logical conditional representation (conditional) that prescribes that if the logical conjunction of the rule cause relationships (rule pre-conditions) is logically fulfilled in a state, and the logical conjunction of the rule consequence relationships (rule post-conditions) is logically consistent with the state, then the conjunction of the consequences should be logically fulfilled in the state; and creating a new output belief data model representing the set of entities, wherein at least a subset of the entities are represented by at least one entity state and a set of conditionals.

18. The computer-implemented method of claim 17, wherein creating the new output belief data model is preceded by generating archetypes, wherein generating archetypes includes deriving the entity states by converting each rule into a logical default conditional, and wherein generating archetypes comprises:

converting each rule into a default conditional prescribing that if the logical conjunction of the rule pre-conditions and the rule post-conditions is logically consistent in a state, then this conjunction should be contained in the state; and calculating the collection of all maximal consistent new states each defined as the logically consistent conjunction of all the post-conditions of any longest combination of those default conditionals for which all their preconditions are fulfilled by the new state.

19. The computer-implemented method of claim 17, wherein the input data model was derived using one of a set of methods including a sequence mining method, a clustering discovering method wherein the entity descriptions are specific clusters associated to generated identifiers, a supervised classification method wherein the entity description is a class logical description and the entity identifier is the class identifier, a sentiment analysis method wherein the entity descriptions correspond to a sentiment logical description of the entity, a topic modeling algorithm, a method that produces state transition models, a Markov Model calculation, a Bayes network calculation algorithm method, and a Kalman filtering algorithm.

20. The computer-implemented method of claim 17, wherein the input data model was derived using a manually or mechanically operated model creation tool capable of creating descriptions of entities and/or rules.

* * * * *

UNITED STATES PATENT AND TRADEMARK OFFICE
CERTIFICATE OF CORRECTION

PATENT NO. : 10,360,513 B2  
APPLICATION NO. : 14/940007  
DATED : July 23, 2019  
INVENTOR(S) : Carlos Luis Araya It is certified that error appears in the above-identified patent and that said Letters Patent is hereby corrected as shown below:

On the Title Page

"(71) Applicant: Carlos Luis Araya, Saratoga, CA (US)"  
Should read:  
--(71) Applicant: Singular Me Corp, Saratoga, CA (US)--

Signed and Sealed this  
Fifteenth Day of October, 2019

Andrei Iancu  
*Director of the United States Patent and Trademark Office*